Figure 6:
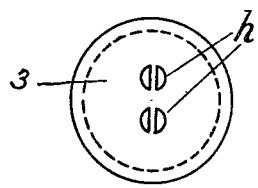

W. DENNISON.
METER BOX.
APPLICATION FILED JULY 3, 1913.
1,101,908.
Patented June 30, 1914.
2 SHEETS—SHEET 1.
Fig. 1.
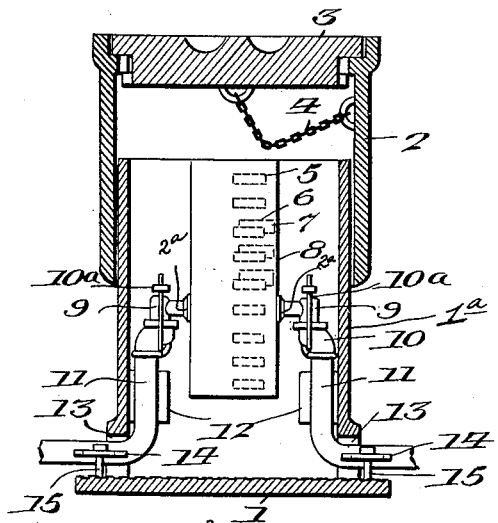
Fig. 2.
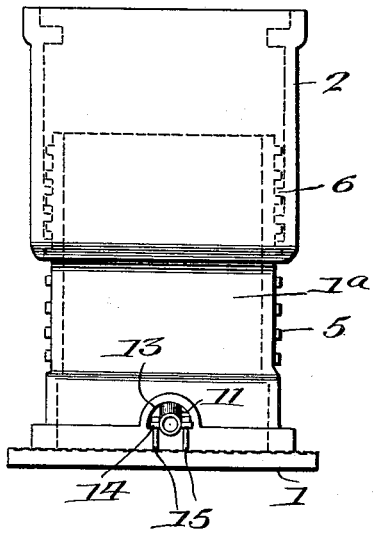
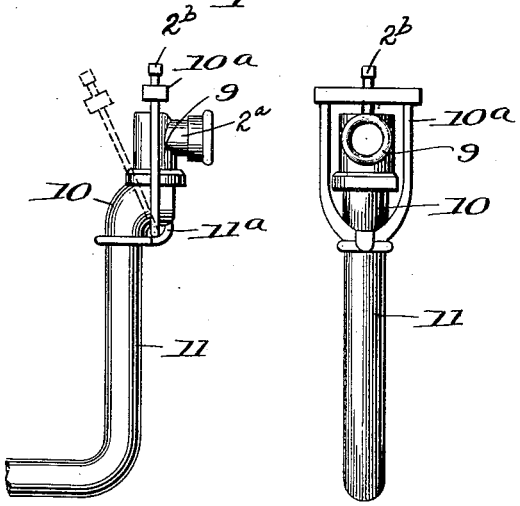
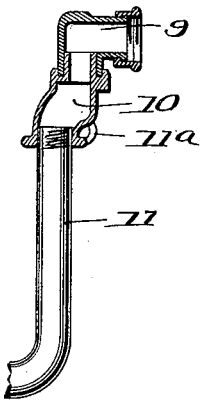
Fig. 3.   Fig. 4.   Fig. 5.
Witnesses
Philip E. Barnes
E. J. Sheehy
Inventor
William Dennison,
By James J. Sheehy & Co.,
Attorneys
COLUMBIA PLANOGRAPH CO., WASHINGTON, D. C.

W. DENNISON.
METER BOX.
APPLICATION FILED JULY 3, 1913.

1,101,908. Patented June 30, 1914.
2 SHEETS—SHEET 2.

WITNESSES
E. J. Sheehy
Frank S. Sheehy

INVENTOR
William Dennison
BY
James Sheehy & Co., ATTORNEYS.

UNITED STATES PATENT OFFICE.

WILLIAM DENNISON, OF NEW ORLEANS, LOUISIANA.

METER-BOX.

1,101,908.  Specification of Letters Patent.  Patented June 30, 1914.

Application filed July 3, 1913. Serial No. 777,185.

*To all whom it may concern:*

Be it known that I, WILLIAM DENNISON, citizen of the United States, residing at New Orleans, in the parish of Orleans and State of Louisiana, have invented new and useful Improvements in Meter-Boxes, of which the following is a specification.

My present invention pertains to meter boxes; and it contemplates the provision of a simple and inexpensive meter box that is well adapted to meet the conditions and withstand the usage to which devices of corresponding character are ordinarily subjected.

The invention in all of its details will be fully understood from the following description and claims when the same are read in connection with the drawings, accompanying and forming part of this specification, in which:

Figure 1 is a sectional view illustrating the meter box constituting the best practical embodiment of my invention that I have as yet devised. Fig. 2 is an elevation of the same. Figs. 3, 4 and 5, are detail views illustrative of one of the couplings comprised in my improvement. Figs. 6 to 17 are views of parts of the box hereinafter specifically referred to.

Similar numerals of reference designate corresponding parts in Figs. 1 to 5.

Among other elements, my novel meter box comprises a mud plate 1 that is corrugated at its upper side, as shown, or is otherwise adapted to drain water from the box. Superposed on the mud plate is a lower cylindrical member $1^a$, and surrounding and extending upwardly from said member $1^a$ is an upper cylindrical member 2, designed to be normally closed by a closure plate 3, that is loosely connected with the member 2 through the medium of a chain 4. In its lower end and at diametrically opposite points, the lower member $1^a$ is provided with bifurcations 13, as illustrated. On its outer side and at diametrically opposite points, the lower member $1^a$ is provided with two vertical series of spaced projections 5. It will also be observed by comparison of Figs. 1 and 2, that the upper member 2 is provided upon its inner side with two diametrically opposite vertical series of spaced projections 6, each of the said projections 6 having a depending portion 7 at one end, designed to bring up against the end of the particular projection 5 on which said projection 6 rests, this with a view to limiting the rotation of the member 2 when it is turned about its axis to place the projections 6 in the spaces between the projections 5, so that said projections 6 will rest on projections 5, and thereby support the upper member 2 in proper position relative to the lower member $1^a$. It will also be observed that the spaces between the projections 5 are considerably greater than the vertical thickness of the projections 6, and that therefore the upper member 2 is capable of a limited vertical movement independently of the member $1^a$, as is desirable when the meter box is disposed in frozen ground.

8 is a meter which *per se* may be of any type without affecting my invention. The said meter is provided at opposite sides with nipples $2^a$, and the said nipples are threaded at their outer ends into couplings 9 having depending portions, as shown, disposed in grooves in couplings 10. The said couplings 10 are provided with bearings $11^a$, Figs. 3 and 5, and in the said bearings is disposed the bail of a swinging loop $10^a$, which carries in its head a screw $2^b$. The said screw is designed to bear on the upper side of the coupling 9, with a view to rendering fluid tight the joint between the coupling 9 and the coupling 10. By virtue of this provision it will be manifest that a tight connection may be quickly made between the couplings or coupling members 9 and 10, and also that when necessary the coupling members 10 may be expeditiously and easily removed from the members 9.

Carried by the coupling members 10 are elbows 11, which are designed to be connected with a main and a house pipe respectively. The lower arms or portions of the said elbows are carried out of the box through the before-mentioned bifurcations 13, and on the said lower arms or portions are longitudinally slotted flanges 14. Extending through the slots in the said flanges 14 are screws 15 that are threaded into or otherwise connected by the mud plate 1. By virtue of this connection it will be manifest that the elbow pipes are strongly connected with the mud plate, and yet either of said elbow pipes can be expeditiously and easily moved inwardly or outwardly relative to the meter or meter box as occasion demands.

Fixed to and extending inwardly from the lower member 1ª of the box are pairs of flanges 12, and between the said flanges 12 the elbows 11 are loosely arranged, this in order to prevent turning of the lower section 1ª about its axis to any material extent.

Figure 7:
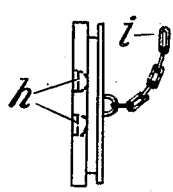
Figure 8:
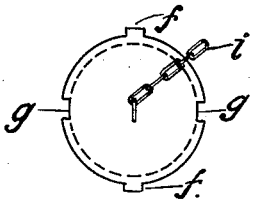
Figure 9:
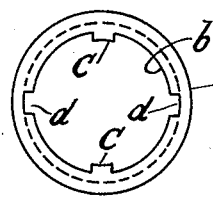
Figure 10:
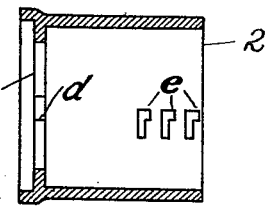
Figure 11:
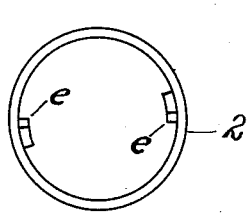

In Figs. 6, 7, and 8 the closure plate 3 is shown as having seats $h$, notches $g$, lugs $f$ and a chain $i$; and in Figs. 9, 10 and 11 the upper member 2 of the box is shown as provided with a flange $b$, notches at $d$ and provided with lugs C, and is also shown as provided with interior projections $e$.

Figure 12:
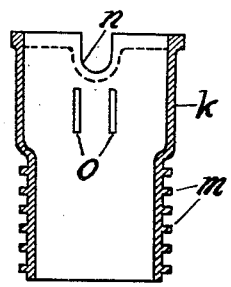
Figure 13:
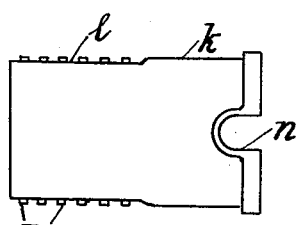

The modified upper section $k$ shown in Figs. 12 and 13 has its upper portion reduced in diameter, and is provided on said portion with projections $m$, designed to coöperate with the projections $e$, which projections $e$ are adapted to enter spaces $l$ between the projections $m$. In its base the section $k$ is provided with notches $n$, corresponding to the notches 13 of Figs. 1 and 2.

Figure 14:
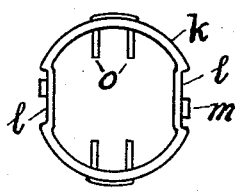
Figure 15:
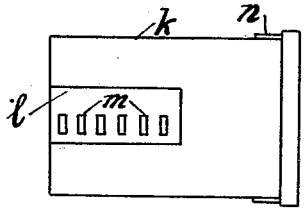

As shown in plan in Fig. 14 the modified lower member or section $k$ is provided with flanges O, corresponding to the flanges 12 of Fig. 1.

Figure 17:
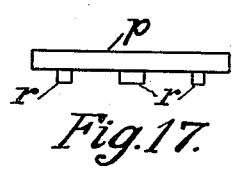
Figure 16:
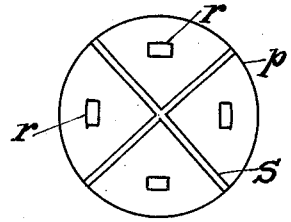

The modified mud plate $p$, shown in Figs. 16 and 17 is provided with ribs S and projections $r$.

When desired the fittings at the bottom of the box can be made square instead of being curved as shown in Figs. 1, 3 and 5. I would also have it understood that the slotted flanges 14 can be made to start from a point adjacent and outside of the meter box, and to extend outwardly relative to the meter box any desired distance in order to enable the operator to easily screw the said flanges 14 downward.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts as in the future practice of the invention such changes or modifications may be made as fairly fall within the scope of my appended claims.

Having described my invention, what I claim and desire to secure by Letters-Patent, is:

1. The combination of a mud plate, a cylindrical member superposed on said plate and having openings at opposite points and adjacent the mud plate, a meter in said member, and elbow pipes having upwardly reaching portions connected with the meter and also having outwardly reaching portions extending through said openings in the member and provided at opposite sides with longitudinally slotted flanges, and headed devices disposed in said slots of the flanges and connected with the mud plate.

2. The combination of a box member, a meter therein, pipes carried outside the box member, coupling members on said pipes, within the box member and having bearings on their lower portions and also having grooves in their upper portions, coupling members connected with the meter and having depending portions seated in said grooves, bails mounted in the bearings of the first-named coupling members and having portions adapted to be disposed above the second-named coupling members, and screws bearing in said portions and adapted to be set against the second-named coupling members.

3. In a meter box, the combination of a mud plate, a lower box section superimposed on the mud plate and having notches in its base and also having pairs of spaced upright flanges on its inner side, a meter disposed in the said section, and conduits connected to the said meter and disposed between the flanges of the section and extending through the notches of the section and coupled to the mud plate.

In testimony whereof I have hereunto set my hand in presence of two subscribing witnesses.

WILLIAM DENNISON.

Witnesses:
 HUGH W. SALBADOR,
 A. J. HENRY.

---

Copies of this patent may be obtained for five cents each, by addressing the "Commissioner of Patents, Washington, D. C."